May 29, 1962
E. H. VICKERY
3,036,600
SEALED BALL VALVE
Filed May 11, 1959
2 Sheets-Sheet 1
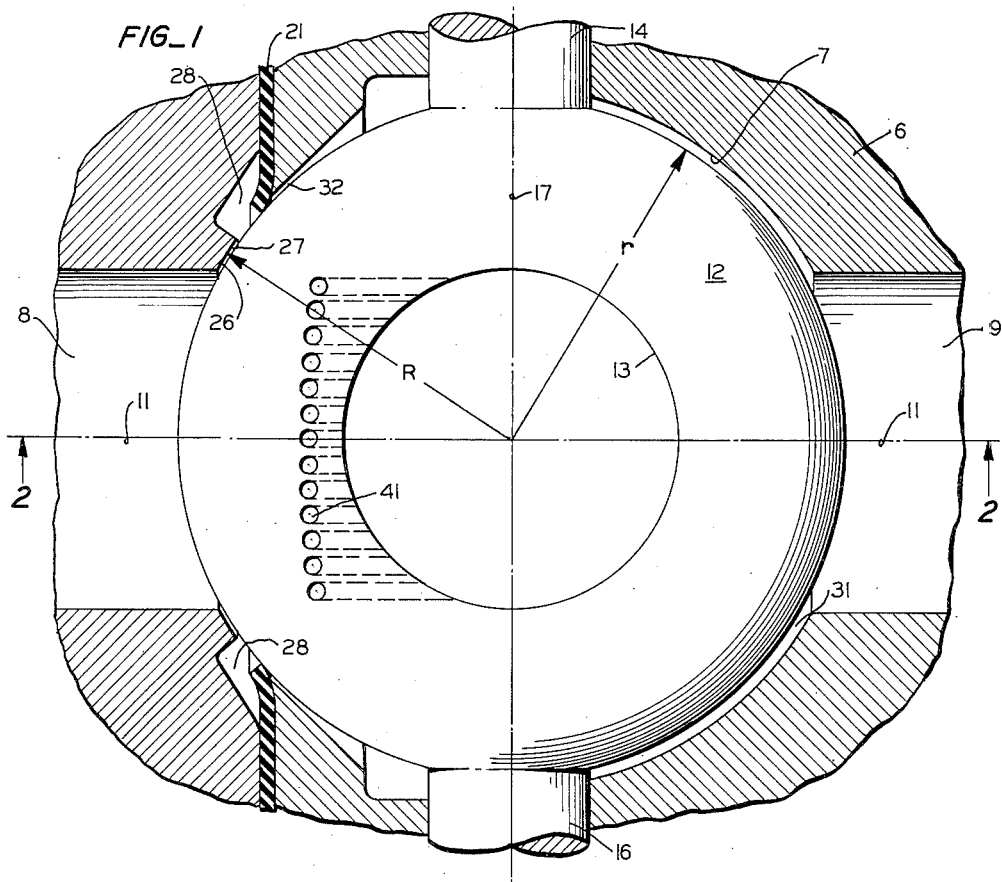
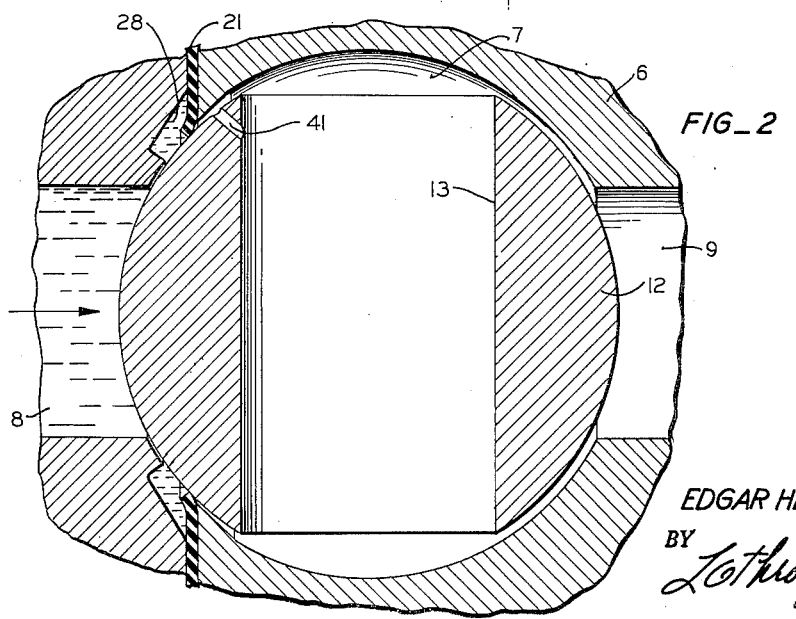
INVENTOR.
EDGAR HERBERT VICKERY
BY Lothrop & West
ATTORNEYS

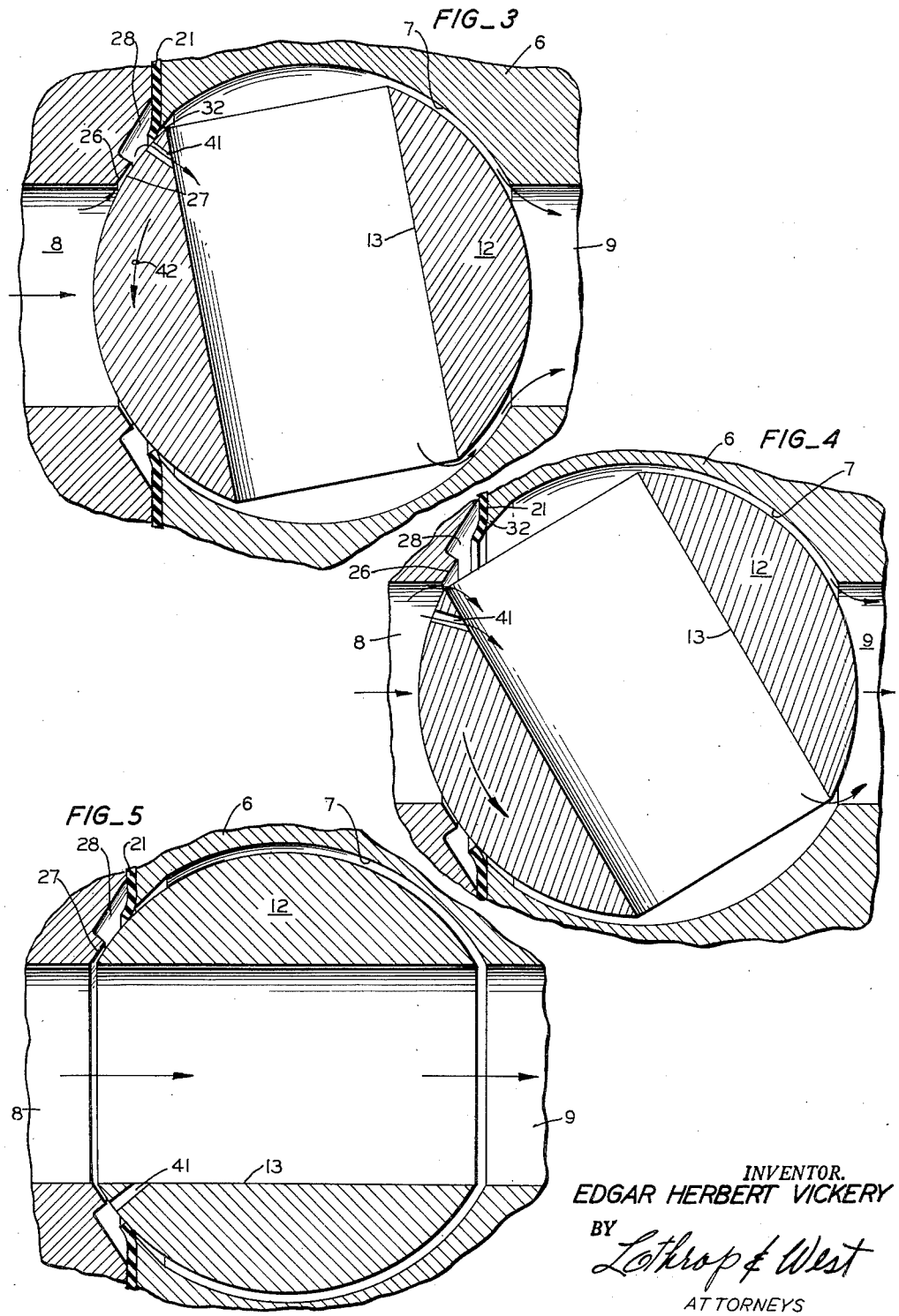

3,036,600
SEALED BALL VALVE

Edgar Herbert Vickery, Oakland, Calif., assignor to Fisher Governor Company, Marshalltown, Iowa, a corporation of Iowa
Filed May 11, 1959, Ser. No. 812,309
4 Claims. (Cl. 137—625.12)

The invention relates to a valve for controlling flow through a conduit subject to high pressures and high and low temperatures and particularly for controlling what are presently rather exotic material, such as liquid oxygen, helium and the like. It is desired to have a valve which is sealed and virtually leak proof when it is closed and which utilizes the high pressure available in the controlled fluid for effectuating some of the sealing pressure, yet one which can be operated with relatively low power between its open and closed positions. Somewhat similar spherical valves are shown in my copending applications entitled "Ball Valve," filed October 9, 1956, with Serial No. 614,842, and "Liquid Oxygen Valve and Actuator," filed August 12, 1957, with Serial No. 677,617, now abandoned.

In the present instance, although similar principles are employed, it is the prime object of the invention to provide a means for reducing the effect of relatively high pressure during much of the movement of the valve between open and closed positions.

Another object of the invention is to provide a valve which is especially useful in throttling; that is, in controlling flow with the valve in neither extreme position but rather disposed between extreme positions and preferably near closed position.

Another object of the invention is to provide means for channeling the flow in a valve especially subject to high pressures in such a fashion that the sealing means is protected and conserved.

Another object of the invention is to provide an improved sealed ball valve.

Other objects of the invention, together with the foregoing, are attained in the embodiment of the invention described in the accompanying description and shown in the accompanying drawings, in which:

FIGURE 1 is an enlarged cross-section through a ball valve housing showing the valve ball in closed position and with various standard parts removed or broken away.

FIGURE 2 is a cross-section similar to FIGURE 1, with the plane of section being taken on the line 2—2 of FIGURE 1 and the scale of the figure being somewhat reduced.

FIGURES 3, 4 and 5 are views similar to FIGURE 2 and show the valve ball in successive positions between fully closed and fully open.

While the sealed ball valve pursuant to the invention can be embodied in a number of different forms, it has been successfully incorporated as shown herein especially for use on liquid oxygen at pressures of about 1,000 pounds per square inch.

In its preferred form, the mechanism includes an outer housing 6 of a construction substantially in accordance with the disclosure in my mentioned applications. The housing 6 is made up of assembled pieces and is hollow; that is, it incorporates an interior central chamber 7. At one side the housing 6 is provided with an inlet passage 8 and at the other side is provided with an outlet passage 9. The inlet and outlet passages are both circular-cylindrical in conformation and they are both centered on a single through axis 11, referred to as a "flow" axis since the direction of flow of fluid through the valve is substantially along the axis 11.

Disposed within the hollow housing is a ball 12, or sphere. The sphere is of a predetermined radius $r$ and is formed with a flow passage 13 therethrough. The passage 13 is circular-cylindrical in contour, the axis of the cylinder being concentric with the ball, and the diameter of the flow passage 13 being substantially the same as the diameter of the inlet passage 8 and of the outlet passage 9.

The ball is mounted within the housing 6 by a pair of bearing trunnions 14 and 16, or shafts, suitably journalled in the housing so that the axis 17 of the journals 14 and 16 passes through the center of the ball and is normal to the flow of axis 11. Either one or the other of the shafts 14 and 16, when rotated, serves as a means for turning the ball about the axis 17 so that the flow passage therein can be moved at will between the closed position with the passage 13 disposed transversely of the axis 11 and an open position in which the passage 13 is in registry with the inlet passage 8 and the outlet passage 9.

Means are provided for precluding substantial leakage through the valve when the valve is closed. This includes a sealing means incorporating an annular seal 21. This is preferably a disk-like member of flexible material clamped around its periphery between adjacent portions of the hollow housing 6. The seal 21 extends into contact with the exterior, spherical surface of the ball 12, the contact being especially firm when the ball is in or near closed position. The seal 21 is approximately planar, or can be considered as substantially flat for the most part, with the plane being normal to the flow axis 11. The seal 21 is concentric with the flow axis 11 and the interior radius of the central opening in the seal 21 is considerably greater than the radius of the inlet passage 8, for example. Thus, the seal 21 is in abutment with the ball at a considerable distance or axial displacement from the end of the inlet passage 8.

Substantially only the radially inner corner, or edge, of the seal 21 is in abutment with the ball 12. Even though the area of the seal in contact with the ball is thus relatively small, the pressure which is imposed upon the upstream side of the seal 21 by the pressure fluid within the inlet passage 8 is relatively high. This is quite effective in slightly deforming the seal into close abutment with the surface of the ball to preclude leakage. A valve constructed in accordance with this disclosure is, upon test, virtually drop-tight at the indicated pressure with liquid oxygen.

Yet, the frictional drag between the seal and the ball under these conditions is relatively large so that a lot of power is required to turn the shafts 14 and 16 to revolve the ball. To maintain the excellent sealing, yet to overcome some of the work involved in turning the ball, there is provided, in accordance with the present invention, a special construction.

As especially shown in FIGURE 1, the material of the housing 6 adjacent the inner end of the inlet passage 8 is finished to afford a surface 26 which in production may be conical but ideally is spherical in nature and which has a radius R slightly larger than the radius $r$ of the ball itself. The surface 26 also has a substantial angular or peripheral extent, as seen in FIGURE 1, so that it is considerably more than a sharp edge or a knife-edge. Flow through a sharp edge orifice does not vary appreciably with viscosity but flow along an elongated surface such as 26 depends upon viscosity. The surface 26 is annular and symmetrical about the flow axis 11. Together with the adjacent surface of the ball 12 (when the ball is in an appropirate position), the surface 26 defines an annular flow path 27 of a predetermined, annular cross-sectional flow area.

At the end of the passage 27, remote from the inlet passage 8, the interior of the hollow housing 6 is enlarged to define an annular compartment 28 adjacent to the surface 26 and extending to an exposed portion of the seal 21.

The cross-sectional area of the flow path 27 is directly dependent upon the difference between the radii R and r. This is conveniently made very small. The actual dimensions vary with the size of the valve itself, with machining tolerances, with temperature changes during operation, with pressure deflections, with wear and possibly other factors. In a valve in which the diameter of the inlet passage 8 is two inches, the difference between the radius r of the spherical surface of the ball and the radius R of the spherical surface 26 within the housing is of the order of .003 of an inch. When this dimension changes by reason of wear in the journals 14 and 16, it can be compensated for by bringing the parts of the housing 6 somewhat closer together or farther apart by a corresponding displacement of the seal 21. A relatively small cross-sectional area is afforded in the flow passage 27 under operating conditions.

Even though the flow passage is relatively small, the pressure within the compartment 28 becomes the same as that within the inlet passage 8 providing there is adequate time for a compensating flow through the flow passage 27. Thus, when the valve is in closed position, as seen in FIGURE 1, in the event the pressure within the compartment 28 is initially low, the superior pressure within the inlet passage 8 is sufficient to cause flow through the flow passage 27 until the compartment 28 is filled with fluid at an equalized pressure. At that time, the pressure on the downstream side of the valve seal may be relatively low since the outlet passage 9 communicates through large clearance volumes 31 with the downstream side of the seal 21, the adjacent conical surface 32 of the hollow housing 6 being spaced a relatively large distance away from the surface of the ball 12. The instaneous difference in pressure between that within the inlet passage 8 and the compartment 28, on the one hand, and that within the downstream or outlet passage 9 and the interior of the hollow housing 6 when the valve is closed is sufficient to press the edge of the seal 21 tightly against the surface of the ball 12 to inhibit leakage.

Pursuant to the invention, there are provided one or more channels 41 extending through the material of the ball 12 from points on the surface thereof and to the flow passage 13 therein. The channels 41 are preferably made simply by drilling holes through the material of the ball and carefully finishing the edges of the drilled holes. The pattern, or arrangement, of the channels 41 is preferably different from the contour of the inlet passage 8 and the interior of the seal 21.

When the valve is closed, as seen in FIGURES 1 and 2, the channels 41 have no particular function since they are at both ends in communication with the hollow interior of the housing 6 and are thus subject to the pressure in the outlet passage 9. As shown in FIGURE 3, however, when the ball 12 has been turned slightly from its closed position in the direction of the arrow 42 in FIGURE 3, the channels 41, or the most advanced one of the several channels 41, rides under the lip of the seal 21 and establishes communication between the compartment 28 and the flow passage 13. As before, the flow passage 13 is in easy communication with the outlet passage 9.

There can then be flow from the inlet passage 8 through the flow path 27 into the compartment 28, then through the channel or channels 41 into the flow passage 13 and out the outlet passage 9. The cross-sectional area, or flow capacity, of the channel 41, considered alone or in connection with some of its neighbors when the ball has sufficiently turned, is somewhat greater than the area of the flow path 27. That being the case, fluid cannot flow into the compartment 28 as fast as it can flow from the compartment to the outlet passage. In a relatively short time, the compartment 28 is reduced in pressure to substantially that of the outlet passage 9 so that the unbalanced pressure on the seal 21 is greatly reduced and becomes very small. There may even be a progressive reduction as the ball 12 is rotated. Consequently, the ball in all but its closed or near-closed locations is relieved of much of the pressure on the seal and turns with little seal friction load and relatively freely.

As the ball continues to turn, as seen in FIGURE 4, the leading edge of the through passage 13 finally clears the trailing edge of the inlet passage 8 and there is substantial flow through the valve. Under these circumstances, the pressure within the compartment 28 is substantially that within the interior of the housing 6 so that there is little or no pressure load on the seal. It will be particularly noted in comparing FIGURES 3 and 4 that the initial fluid flow through the channel 41 and adjacent the edge of the seal 21 is primarily over metal surfaces so that the relatively high initial flow velocity due to great inital pressure drop is not directly on much of the edge of seal. There is consequently little or no tendency for the seal to be pressed into the through passage 13 of the ball and the seal maintains its shape or is well supported during the inital, very high velocity flow. By the time the valve ball 12 has gotten into the FIGURE 4 position, the flow again is substantially over metal parts and the lip of the seal 21 is to one side of the main flow.

As the valve ball continues to revolve into its fully open position (FIGURE 5), the adjacent solid, spherical surface of the ball underlies or faces the spherical surface 26, again establishing a relatively restricted or predetermined flow path. The main flow is, of course, through the valve and the pressure existing within the flow passage is readily transmitted to the compartment 28 so that the pressure on the seal is substantially balanced but the seal itself is in a protected compartment or backwater, so to speak, with the possibly turbulent flow and any foreign particles kept away very largely by the closely meeting surface 26 and the surface of the ball.

In closing, the ball is returned, for example, from its FIGURE 5 to its FIGURE 4 position. Some throttling takes place, as shown in FIGURE 4, but this is not directly at the valve seal itself. When the valve ball has turned into its FIGURE 3 position, or as it approaches its FIGURE 3 position from its FIGURE 4 position, the solid surface of the ball more and more underlies the spherical surface 26. There is then a substantial throttling of the flow into the compartment 28 while the channels 41 are still in communication therewith. Thus, there is still no substantial pressure difference existing across the seal 21 until just after the position shown in FIGURE 3, when the passages 41 progressively leave the lip of the seal 21 and isolate the compartment 28 from downstream pressure. The upstream pressure existing within the inlet passage 8 then is communicated through the flow path 27 so that the pressure within the compartment 28 builds up and exerts a substantial force on the seal 21 to press the lip of the seal against the spherical surface of the substantially closed ball, again to exert a heavy frictional load and to stop leakage.

While passages such as 41 are referred to herein in the plural, it is entirely possible to connect all of the channels 41 to provide but a single passage, and it is possible to have the channels 41 of different diameters and in different patterns. It is preferred in practice to have a number of such passages and to keep them relatively small so that they move across the lip of the seal readily without substantial deformation of the seal and with adequate support for the lip of the seal in all positions of the ball.

What is claimed is:

1. A sealed ball valve comprising a hollow housing having an inlet passage and an outlet passage, said inlet and outlet passages being circular-cylindrical and centered on a flow axis extending through said housing, a ball having a flow passage therethrough, said flow passage being circular-cylindrical about a diameter of said ball, means for mounting said ball within said housing for rotation about a cross axis normal to said flow axis, means for rotating said ball about said cross axis between a first position with said flow passage in registry with said inlet and outlet passages and a second position with said flow passage out of registry with said inlet and outlet passages, an annular seal in said housing and extending into contact with the surface of said ball around said flow passage when said ball is in said first position, means in said housing establishing a surface between said inlet passage and said circular seal and disposed a predetermined radial distance from the surface of said ball when said ball is in said second position to define an annular flow path of predetermined cross-sectional flow area, means on said housing defining a compartment of larger volume than said flow path between said flow path and said seal and in constant contact with said seal, and means forming channels through said ball between the spherical surface thereof and said flow passage and positioned to communicate with said annular flow path through said compartment when said ball is between said first and second positions, the cross-sectional area of said channels being greater than said predetermined cross-sectional area of said flow path.

2. A sealed ball valve comprising a hollow housing having an inlet passage and an outlet passage, said inlet and outlet passages being circular-cylindrical and centered on a flow axis extending through said housing, an annular seal within said housing coaxial with and larger in interior diameter than said inlet passage, means establishing a spherical surface of predetermined radius within said housing surrounding said inlet passage and between said inlet passage and said seal, means establishing an annular compartment in said housing between said spherical surface and said seal with said compartment being formed by a wall on said housing having a greater radius of curvature than said spherical surface, a ball of less than said predetermined radius having a flow passage therethrough, said flow passage being circular-cylindrical about a diameter of said ball, means for mounting said ball within said housing and centered on said flow axis and for rotation about a cross axis normal to said flow axis, means for rotating said ball about said cross axis between a first position with said flow passage in registry with said inlet and outlet passages and a second position with said flow position out of registry with said inlet and outlet passages, and means including channels through said ball for establishing communication between said compartment and said outlet passage when said ball is between said first position and said second position, the circular clearance area defined by the difference between the radius of said spherical surface and the radius of said ball being less than the cross-sectional area of said channels.

3. A sealed ball valve comprising a housing having an inlet and an outlet, a ball rotatably mounted in said housing, said ball having a flow passage therethrough adapted to connect with said inlet and said outlet in a first rotated position of said ball and to disconnect with said inlet and said outlet in a second rotated position of said ball, an annular seal in said housing surrounding said inlet and extending into contact with said ball, means affording free flow from the outlet side of said seal to said outlet, means on said housing defining an annular surface surrounding said inlet and located between said inlet and said seal and spaced from said seal to leave an intervening annular compartment of larger volume adjacent said seal than the volume of said compartment adjacent said inlet, said surface being spaced from the surface of said ball a predetermined distance to establish a flow path of one predetermined size adjacent said inlet and a larger size adjacent said seal, and means forming a flow path of a size larger than said predetermined size from said compartment to the outlet side of said seal and effective only when said ball is out of said first and second rotated positions.

4. A sealed ball valve as in claim 3 in which said flow path forming means is in part a channel in said ball extending from the spherical surface of said ball into said flow passage.

References Cited in the file of this patent

UNITED STATES PATENTS

| 2,547,116 | Gould | Apr. 3, 1951 |
| 2,604,293 | Phillips | July 22, 1952 |
| 2,839,074 | Kaiser | June 17, 1958 |
| 2,882,010 | Bryant | Apr. 14, 1959 |
| 2,890,856 | Clade | June 16, 1959 |

FOREIGN PATENTS

| 739,290 | Germany | Sept. 18, 1943 |
| 744,193 | Germany | Jan. 12, 1944 |
| 761,890 | Germany | Jan. 11, 1954 |